US006302664B1

(12) United States Patent
Kazakis et al.

(10) Patent No.: US 6,302,664 B1
(45) Date of Patent: Oct. 16, 2001

(54) OILERS ROTARY SCROLL AIR COMPRESSOR AXIAL LOADING SUPPORT FOR ORBITING MEMBER

(75) Inventors: Michael V. Kazakis, Simpsonville; Charlie E. Jones, Greenville, both of SC (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/583,698

(22) Filed: May 31, 2000

(51) Int. Cl.[7] ........................................................ F03C 2/00
(52) U.S. Cl. ............................ 418/55.3; 418/55.3; 418/55.6
(58) Field of Search .................................... 418/55.3, 55.6

(56) References Cited

U.S. PATENT DOCUMENTS

| | | | |
|---|---|---|---|
| 2,809,779 | * 10/1957 | Girvin | 418/55.3 |
| 3,874,827 | * 4/1975 | Young | 418/55.3 |
| 4,406,600 | * 9/1983 | terauchi et al. | 418/55.3 |
| 4,609,334 | * 9/1986 | Muir et al. | 418/55.3 |
| 4,840,549 | * 6/1989 | Morishita et al. | 418/57 |
| 4,927,339 | * 5/1990 | Riffe et al. | 418/55.3 |
| 4,938,669 | * 7/1990 | Fraser, Jr. et al. | 418/55.5 |
| 5,088,906 | * 2/1992 | Richardson et al. | 418/55.6 |
| 5,342,186 | * 8/1994 | Swain | 418/55.5 |
| 5,346,376 | * 9/1994 | Bookbinder et al. | 418/55.5 |
| 5,366,359 | * 11/1994 | Bookbinder et al. | 418/55.5 |
| 5,593,295 | * 1/1997 | Hill | 418/55.3 |

FOREIGN PATENT DOCUMENTS

| | | | |
|---|---|---|---|
| 38152 A1 | * 10/1981 | (EP) | 418/55.3 |
| 91544 A1 | * 10/1983 | (EP) | 418/55.3 |

* cited by examiner

Primary Examiner—Thomas Denion
Assistant Examiner—Theresa Trieu
(74) Attorney, Agent, or Firm—James Ray & Associates

(57) ABSTRACT

An axial load resistant anti-rotation bearing for a rotary scroll compressor is disclosed. The rotary scroll compressor includes stationary and orbiting scroll elements and a drive mechanism for driving the orbiting scroll element in an orbit about the stationary scroll element. The stationary and orbiting scroll elements are intermeshed and nested to form at least one spiraling compression pocket therebetween. The at least one compression pocket generates forces which tend to force the stationary and orbiting scroll elements apart in a direction parallel to their central axes. The axial load resistant anti-rotation bearing disclosed resists such axial separating forces and employs two rotational bearing components, a first rotational bearing component mounted on the interior of the compressor housing and a second rotational bearing component mounted on the orbiting scroll element. At least one, and preferably both, of the rotational bearing components are designed such that they include a bearing surface which projects a nonzero component in the direction of the central axes of the stationary and orbiting scroll elements. At least one, and preferably both, of the rotational bearing components are of the angular contact bearing type.

30 Claims, 11 Drawing Sheets

1

OILERS ROTARY SCROLL AIR COMPRESSOR AXIAL LOADING SUPPORT FOR ORBITING MEMBER

CROSS-REFERENCES TO RELATED APPLICATIONS

The present application is directed to similar subject matter as is disclosed in the following U.S. Patent Applications:

"Oiless Rotary Scroll Air Compressor Crankshaft Assembly", U.S. Pat. application Ser. No. 09/584,324, filed on Jun. 1, 2001 by Michael V. Kazakis and Charlie E. Jones;

"Oiless Rotary Scroll Air Compressor Antirotation Assembly", U.S. Pat. application Ser. No. 09/584,711, filed on Jun. 1, 2001 by Michael V. Kazakis and Charlie E. Jones;

"Oiless Rotary Scroll Air Compressor Antirotation Lubrication Mechanism", U.S. Pat. application Ser. No. 09/584,710, filed on Jun. 1, 2001 by Michael V. Kazakis and Charlie E. Jones;

"Oiless Rotary Scroll Air Compressor Tipseal Assembly", U.S. Pat. application Ser. No. 09/584,323, filed on Jun. 1, 2001 by Michael V. Kazakis and Charlie E. Jones; and "Oiless Rotary Scroll Air Compressor Air Inlet Valve", U.S. Pat. application Ser. No. 09/584,709, filed on Jun. 1, 2001 by Michael V. Kazakis and Charlie E. Jones.

The subject matter disclosed in each of the above cross-referenced copending U.S. patent applications is hereby expressly incorporated by reference with the same effect as if fully set forth herein.

FIELD OF THE INVENTION

The present invention relates, in general, to scroll compressors which are used to compress a fluid, for example, a gas such as a refrigerant for cooling purposes or ambient air in order to furnish a compressed air supply.

More particularly, the present invention relates to an axial support to resist axial compression forces in such a rotary scroll compressor.

BACKGROUND OF THE INVENTION

So-called "scroll" compressors have achieved wider application recently, particularly in the fields of refrigeration and air conditioning, due to a number of advantages which they possess over reciprocating type compressors. Among these advantages are; low operating sound levels; reduction in "wear parts" such as compression valves, pistons, piston rings and cylinders (resulting in reduced maintenance); and increased efficiency versus reciprocating compressor designs.

DESCRIPTION OF THE RELATED ART

While the number of wear parts in a scroll compressor may be reduced in comparison to a reciprocating type compressor, there are still a number of surfaces which move relative to one another and lubrication between these surfaces cannot be ignored One design for a refrigerant scroll compressor (e.g., a scroll compressor used in air conditioning, etc.) utilizes an oil sump located in the lowermost portion of the compressor housing and an oil pump which draws oil from the sump upward to lubricate the moving parts of the compressor. The oil used as a lubricant in such a design is relatively free to mix with the air which is being compressed. lubricating oil which becomes suspended in the refrigerant is, for the most part, separated therefrom by changing the direction of flow of the refrigerant and by impinging the refrigerant on surfaces located within the compressor. After it is separated, the oil is then drained back to the oil sump.

However, due to the gas having been relatively free to mix with the oil lubricant, the compressed gas exiting the scroll compressor may still have a relatively high degree of oil content. Such oil content may carry over to the compressed gas supply system and have deleterious effects such as reduced life of air driven mechanisms (e.g., air driven tools, brakes, etc.) which utilize the compressed gas supply as a power source.

OBJECTS OF THE INVENTION

One object of the present invention is the provision of a rotary scroll compressor which is "oiless" in the sense that the lubricant used to lubricate the various moving parts of the compressor is not intermingled with the gas being compressed. Thus, there is no contamination to the compressed gas due to the lubricant, and additional special provisions or designs need not be utilized for separating the lubricant from the compressed gas prior to using the compressed gas.

Another object of the present invention is the provision of a novel and inventive axial load resistant anti-rotation bearing device for a rotary scroll compressor which serves to resist axial forces exerted by the compressed gas within the compression apparatus without the need to employ back pressure to compensate for these axial forces tending to separate the stationary and orbiting scroll elements. The novel and inventive axial load resistant anti-rotation bearing device utilizes, most preferably, angular contact bearing assemblies to directly neutralize such axial forces.

A further object of the present invention is the provision of an axial load resistant anti-rotation bearing which is inexpensive to manufacture and reliable in operation.

In addition to the objects and advantages of the present invention described above, various other objects and advantages of the invention will become more readily apparent to those persons skilled in the relevant art from the following more detailed description of the invention, particularly when such description is taken in conjunction with the attached drawing Figures and with the appended claims.

SUMMARY OF THE INVENTION

In one aspect, the intention generally features an axial force resistant anti-rotation bearing for a scroll compressor, the axial force resistant anti-rotation bearing being able to resist both radial and axial forces, the scroll compressor including a housing, a stationary scroll element mounted within the housing substantially stationary with respect to the housing and having a stationary spiral flange projecting therefrom, an orbiting scroll element disposed within the housing and having an orbiting spiral flange projecting therefrom, the stationary and orbiting spiral flanges being intermeshed and nested with one another to define a spiraling compression pocket therebetween, each of the stationary and orbiting scroll elements having a substantially central axis, and an orbital drive mechanism for driving the central axis of the orbiting scroll element in an orbit at a radius of orbit about the central axis of the stationary scroll element, the axial force resistant anti-rotation bearing including a first bearing element mounted substantially stationary with respect to the stationary scroll element, a second bearing element mounted on the orbiting scroll element and a crank member interconnecting the first and second bearing elements, the crank member including a first shaft portion being rotatably engaged with the first bearing element and the second shaft portion being rotatably engaged with the second bearing element, the first and second shaft portions of the crank members having a radial offset with respect to one another, at least one of the first bearing element and the second bearing element including a bearing surface which projects a substantially nonzero component in a direction of the central axes of the stationary and orbiting scroll elements.

In another aspect, the invention generally features an improvement in a rotary scroll compressor of the type described, the improvement including an axial force resistant anti-rotation bearing capable of resisting both radial and axial forces and including a first bearing element mounted on the compressor housing which is fixed with respect to the stationary scroll, a second bearing element mounted on the orbiting scroll element and a crank member interconnecting the first and second bearing elements, the crank member including a first shaft portion being rotatably engaged with the first bearing element and the second shaft portion being rotatably engaged with the second bearing element, the first and second shaft portions having a radial offset with respect to one another, at least one of the first and second bearing elements including a bearing surface which projects a substantially nonzero component in a direction of the central axes of the stationary and orbiting scroll elements.

In yet another aspect, the invention generally features a scroll compressor including an axial force resistant anti-rotation device, including a housing, a stationary scroll element mounted within the housing substantially stationary with respect to the housing, the stationary scroll element including a stationary spiral flange, an orbiting scroll element disposed within the housing, the orbiting scroll element including an orbiting spiral flange, the stationary and orbiting spiral flanges being intermeshed and nested with one another to define a spiraling compression pocket therebetween, each of the stationary and orbiting scroll elements having a substantially central axis, an orbital drive mechanism for driving the central axis of the orbiting scroll element in an orbit at a radius of orbit about the central axis of the stationary scroll element, the axial force resistant anti-rotation device for maintaining the orbiting scroll element substantially non-rotational with respect to the stationary scroll element during orbiting of the central axis of the orbiting scroll element about the central axis of the stationary scroll element, the axial force resistant anti-rotation device being able to resist both radial and axial forces and including a first bearing element mounted substantially stationary with respect to the stationary scroll element, a second bearing element mounted on the orbiting scroll element and a crank member interconnecting the first and second bearing elements, the crank member including a first shaft portion being rotatably engaged with the first bearing element and the second shaft portion being rotatably engaged with the second bearing element, the first and second shaft portions of the crank members having a radial offset with respect to one another, at least one of the first bearing element and the second bearing element including a bearing surface which projects a substantially nonzero component in a direction of the central axes of the stationary and orbiting scroll elements.

The present invention will now be described by way of a articularly preferred embodiment, reference being made to the various Figures of the accompanying drawings, wherein:

DETAILED DESCRIPTION OF THE PREFERRED EMBODIMENT

Figure 1:
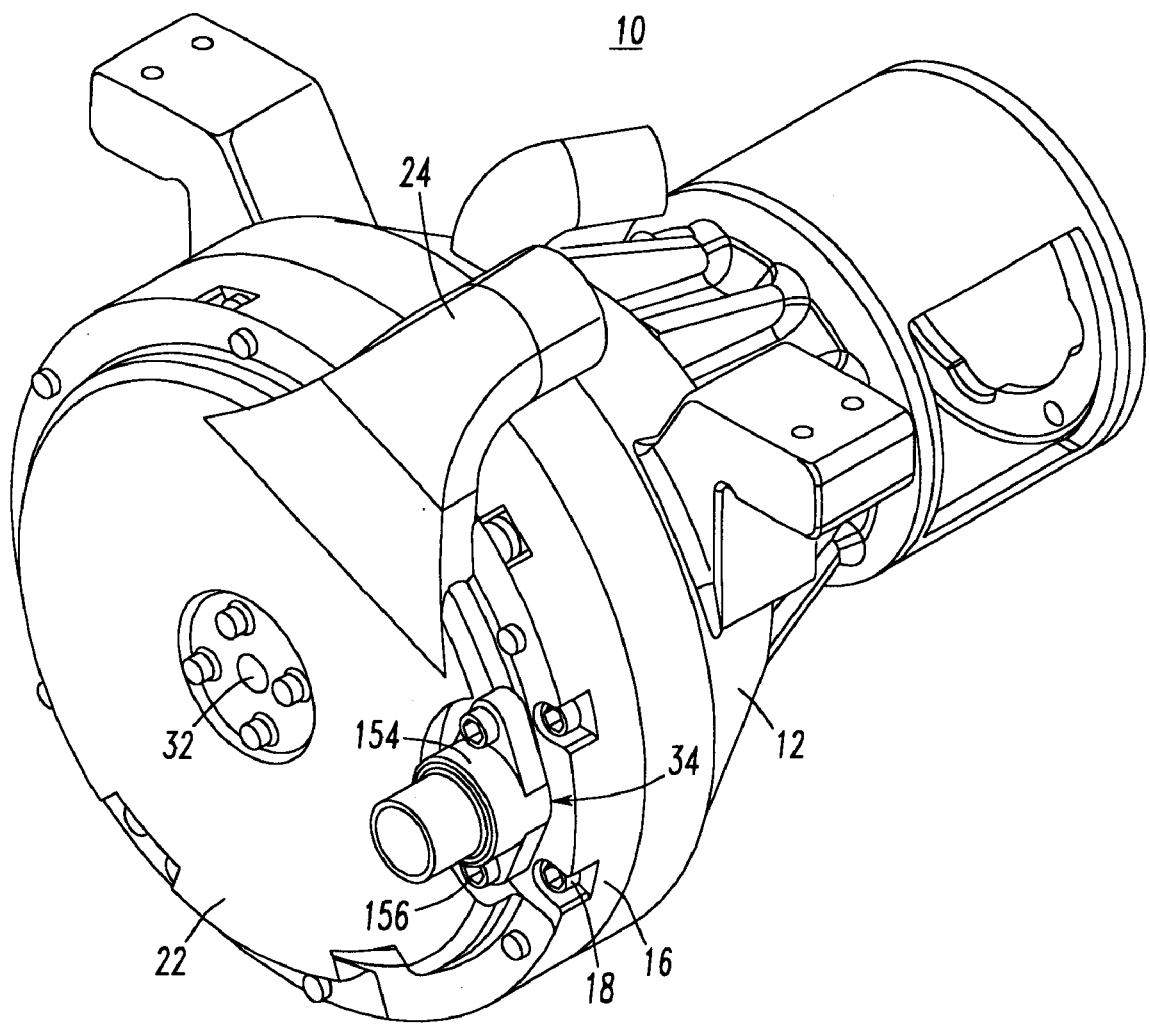
FIG. 1 is a perspective view of an oiless rotary scroll compressor, constructed according to the present invention.

Prior to proceeding to a much more detailed description of the present invention, it should be noted that identical components which have identical functions have been identified with identical reference numerals throughout the several views illustrated in the drawing Figures for the sake of clarity and understanding of the invention.

Figure 2:
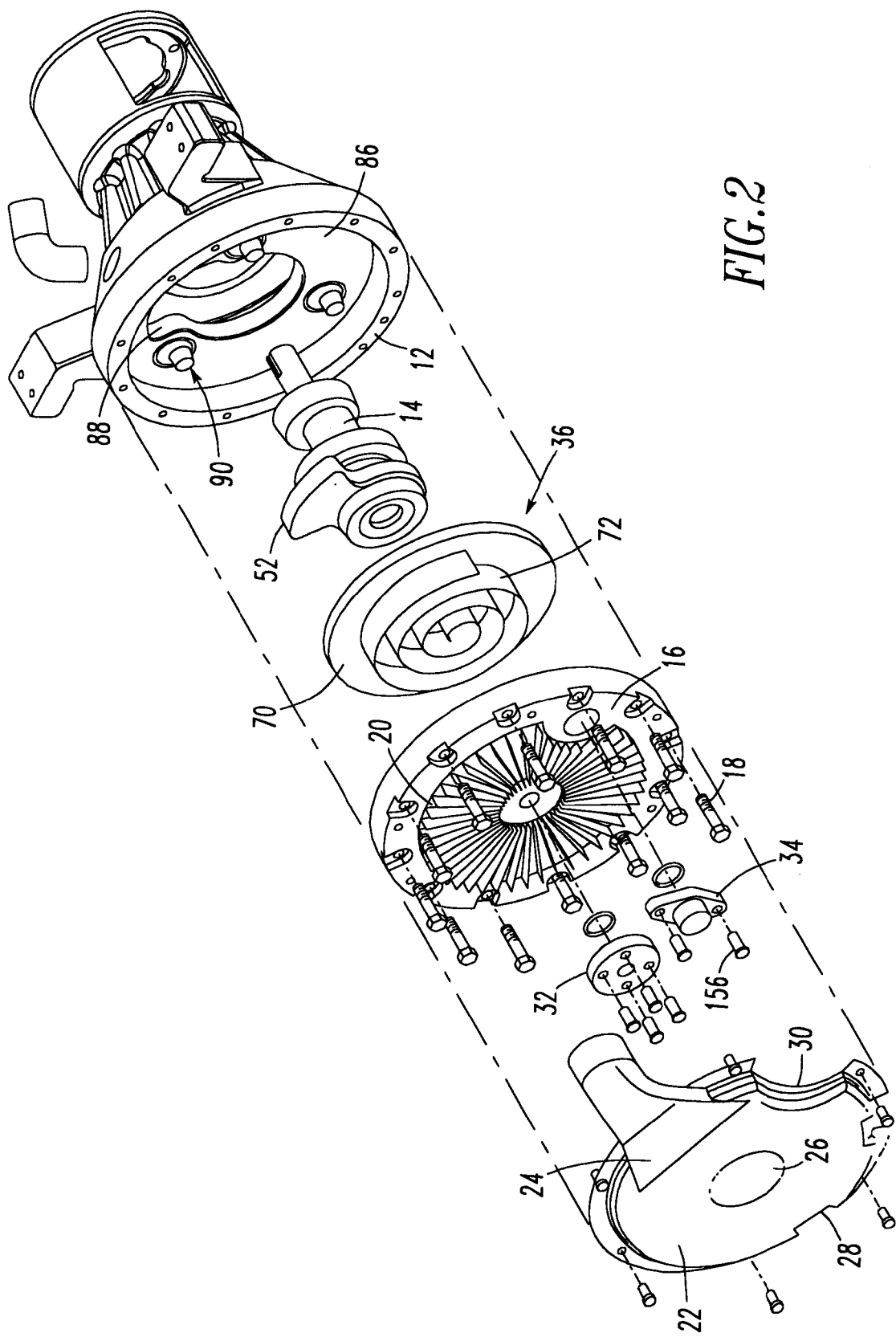
FIG. 2 is an exploded isometric view of the inventive oiless rotary scroll compressor.
Figure 6:
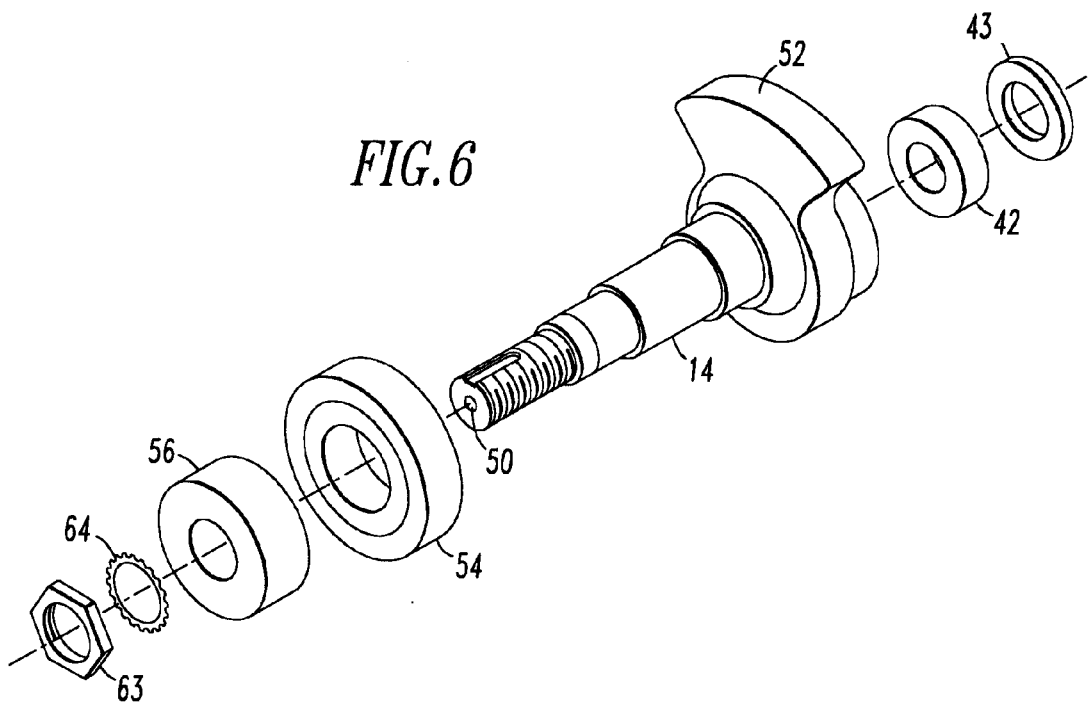
FIG. 6 is an exploded isometric view of a crankshaft used in the inventive oiless rotary scroll compressor.

Referring initially to FIGS. 1 and 2, a scroll compressor constructed according to the present invention and generally designated by reference numeral 10 generally includes a bearing cap 12, a crankshaft 14 positioned within the bearing cap 12 and a stationary scroll 16. The stationary scroll 16 is bolted to the bearing cap 12 through a circular arrangement of bolts 18 with associated washers, lockwashers, etc. The stationary scroll 16 itself is provided with a series of radially extending fins 20 to improve the dissipation of heat therefrom. In the presently preferred embodiment, the radially extending fins 20 are preferably provided in the form of a separate bolt-on heat sink. The radially extending fins 20 could, however, be furnished integral with the stationary scroll 16. A hood 22 substantially covers the fins 20 and is provided with a forced air intake 24 through which ambient air is preferably forced toward the stationary scroll 16 and fins 20 to aid in heat dissipation. This forced air escapes through a central aperture 26 and through openings 28 and 30 provided about the periphery of the hood 22. The central aperture 26 also provides clearance for a compressed air discharge port 32 located in the center of the stationary scroll 16, while the peripheral opening 30 additionally provides clearance for an air inlet valve assembly 34 disposed on a peripheral portion of the stationary scroll 16, The crankshaft 14 is rotationally driven within the bearing cap 12 by a rotational power source of choice, For example, when the scroll compressor 10 is to be employed to supply compressed air for a pneumatic braking system of a diesel or electric rail transportation vehicle (e.g, a train or light rail vehicle), the crankshaft 14 will typically be rotationally driven by an electric motor. The crankshaft 14 in turn drives an orbiting scroll element 36 in an orbital motion within the bearing cap 12. The orbiting scroll element 36 meshes with a stationary scroll element 37 (shown in FIGS. 3 and 4) which is preferably formed integrally with the stationary scroll 16 and is described more fully below. The mechanism by which the orbiting scroll element 36 is driven in such orbital fashion is more clearly shown in FIGS. 3, 6 and 7, to which we now turn.

The crankshaft 14 includes an elongated shaft portion 38 having a central axis of rotation 40 about which the crankshaft 14 is rotationally driven by the power source of choice. An orbiting cylindrical bearing 42 is affixed to a first distal end of the crankshaft 14 adjacent the orbiting scroll element 36. Preferably, this first distal end of the crankshaft adjacent the orbiting scroll element 36 is provided with a recessed cup portion 44 formed integrally thereon, and the orbiting cylindrical bearing 42 is disposed within the recessed cup portion 44. The orbiting scroll element 36 also has a central axis 46 and is provided with a hub portion 48 which projects along this central axis 46 into the orbiting cylindrical bearing 42 to thereby rotationally engage the orbiting cylindrical bearing 42. The orbiting cylindrical bearing 42 is positioned such that it is radially offset from the central axis of rotation of the crankshaft by a distance r, with the result that the orbiting cylindrical bearing 42, the hub portion 48 and the orbiting scroll element 36 itself are all driven by the crankshaft 14 in an orbital motion having a radius of orbit equal to r about the central axis 40 of the crankshaft 14.

In order to provide lubrication access to the orbiting cylindrical bearing 42, the crankshaft 14 is provided with a lubricating channel 50 which extends from its second and opposite distal end to a point adjacent the orbiting cylindrical bearing 42. Preferably, as shown, the lubricating channel 50 extends along the central axis 40 of the crankshaft member 14 to the recessed cup portion 44. Provision of the lubricating channel 50 allows the orbiting cylindrical bearing 42 to be lubricated from a readily accessible single vantage point, namely, the second distal end of the crankshaft 14, during maintenance.

The lubricating channel 50 also serves another function during assembly of the scroll compressor 10. More particularly, during assembly, the hub portion 48 of the orbiting scroll element 36 enters the orbiting bearing 42. During this step, the lubricating channel 50 serves as a vent, allowing any air that would be otherwise trapped to be vented.

Figure 4:
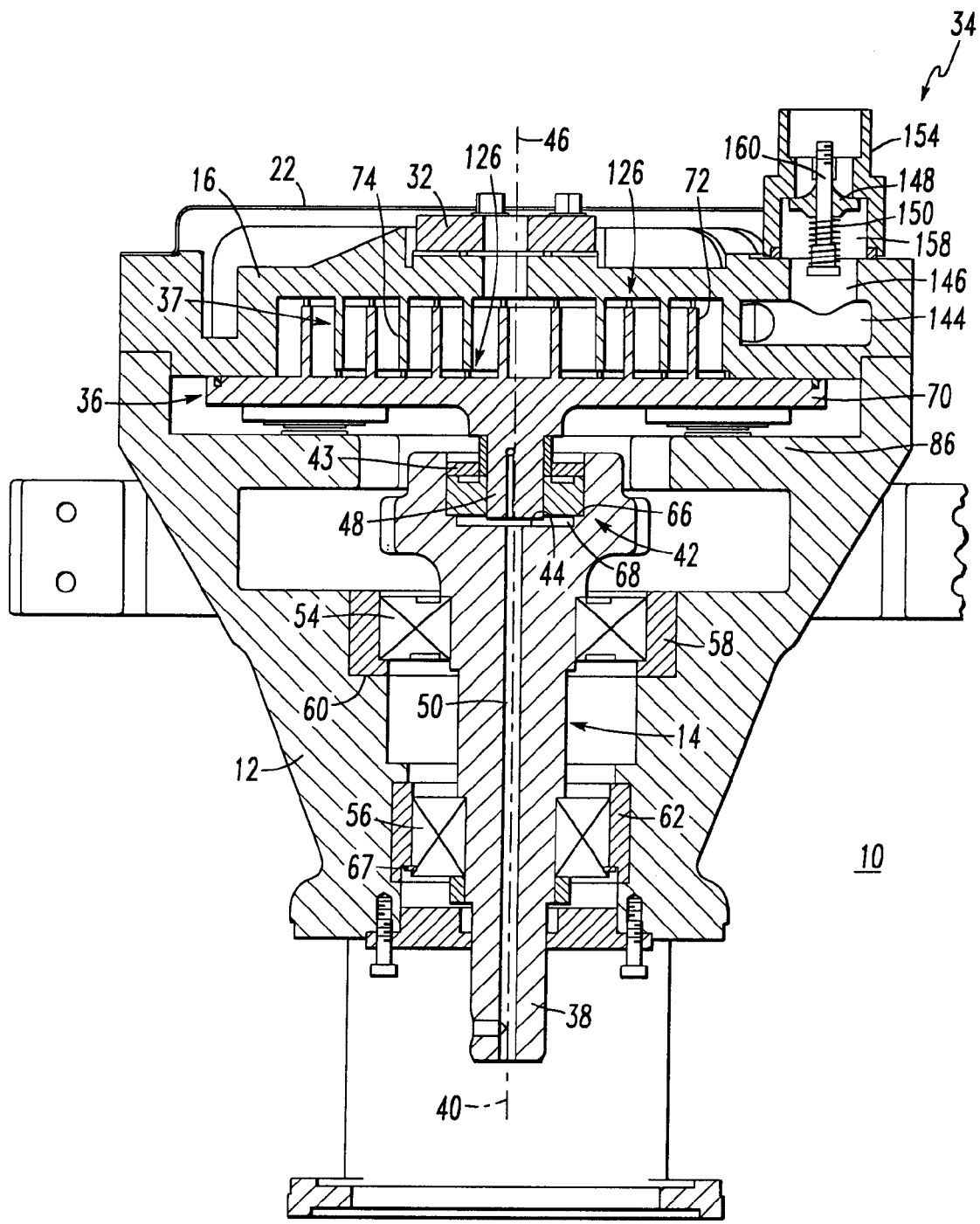
FIG. 4 is another cross sectional elevational view of the inventive oiless rotary scroll compressor, taken along a section rotated approximately 90° from the section of FIG. 3.

The crankshaft 14 is additionally preferably furnished with a counterweight portion 52 that extends radially from the shaft portion 38 in a direction opposite to the radial offset r of the orbiting cylindrical bearing 42 from the central axis 40 of the crankshaft 14. The crankshaft 14 is rotationally mounted within the bearing cap 12 through the provision of a main crankshaft bearing 54 and a rear crankshaft bearing 56 The main crankshaft bearing 54 rotationally engages the shaft portion 38 at a point that is between the first distal end near the orbiting cylindrical bearing 42 and the second distal end of the crankshaft 14, while the rear crankshaft bearing 56 rotationally engages the shaft portion 38 at a point that is between the main crankshaft bearing 54 and the second distal end of the crankshaft 14. Both of the main and rear crankshaft bearings 54 and 56 may be, for example, of a caged roller bearing design or a caged ball bearing design The orbiting cylindrical bearing 42 may be only of a caged roller bearing design. The main crankshaft bearing 54 is preferably positioned within the bearing cap 12 by a main bearing sleeve 58 having a radially inwardly extending lip 60. A rear bearing sleeve 62 similarly serves to position the rear crankshaft bearing 56 within the bearing cap 12. As seen most clearly in FIGS. 6 and 7, a crankshaft locknut member 63 urges a crankshaft lockwasher member 64 into contact with a rear surface of the crankshaft rear bearing 56. The rear bearing sleeve 62 is provided with an inwardly extending ledge 65. A snap ring 67 (shown most clearly in FIGS. 4 and 7) snaps into a groove encircling the exterior face of the rear crankshaft bearing 56. The snap ring 67 limits axial movement of the crankshaft 14 in an upward direction (as seen in FIG. 4), thereby locking the crankshaft axially within the bearing cap 12.

Figure 3:
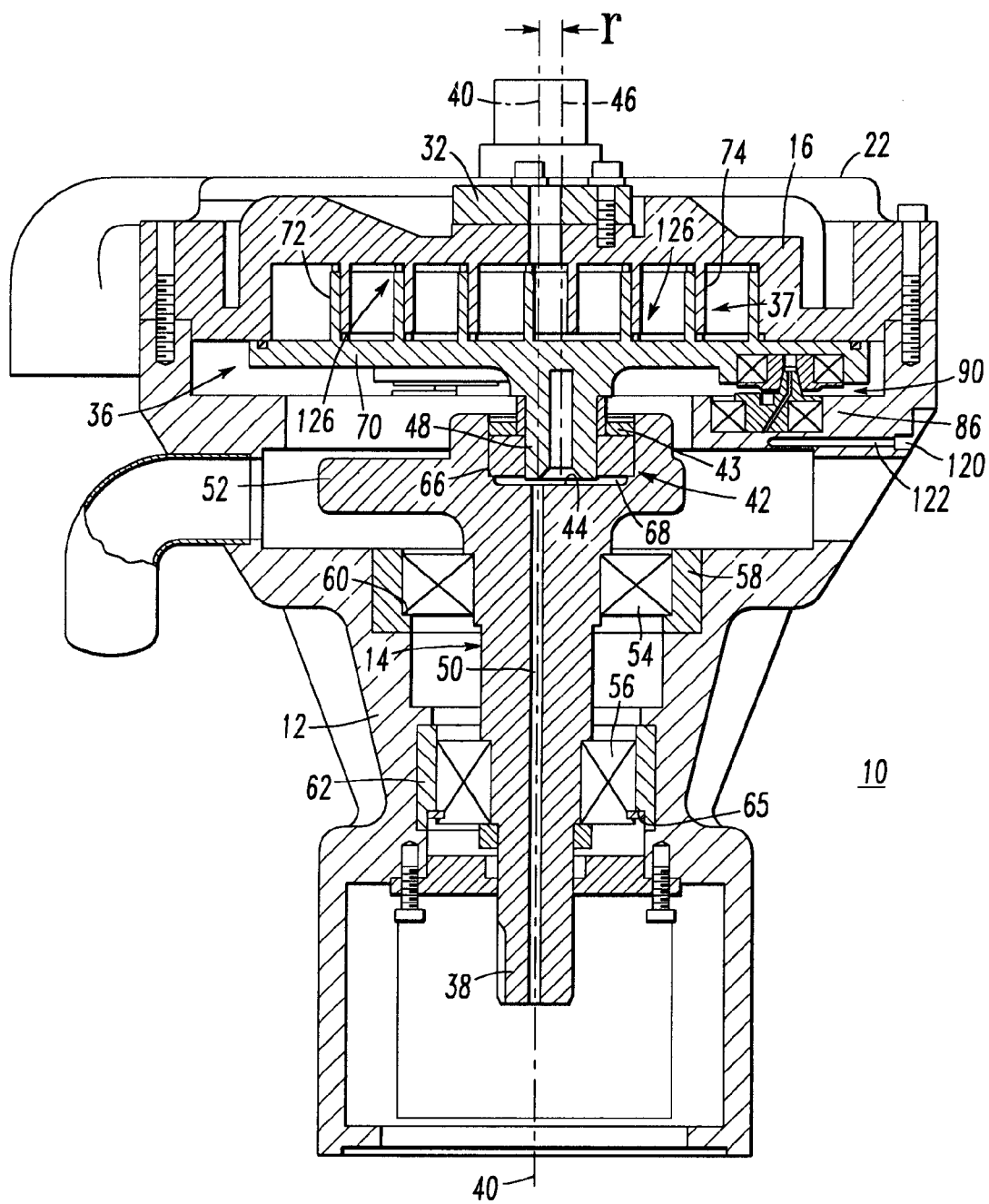
FIG. 3 is a cross sectional elevational view of the inventive oiless rotary scroll compressor.
Figure 7:
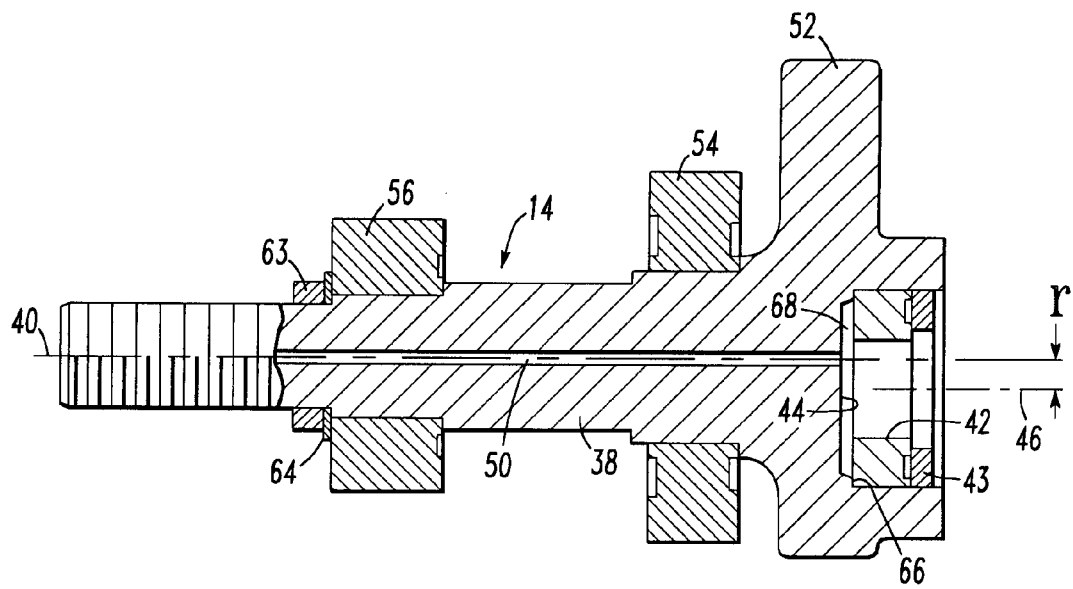
FIG. 7 is a cross sectional elevational view of the crankshaft of FIG. 6.

As shown in FIGS. 3 and 7, the recessed cup portion 44 is provided with an annular ledge 66 spaced away from the bottom of the recessed cup portion 44. The orbiting cylindrical bearing 42 rests on this annular ledge 66 to thus create a lubrication reservoir 68 beneath the orbiting cylindrical bearing 42, the lubrication reservoir 68 being connected to the lubrication channel 50. An orbiting seal 43 overlays the orbiting cylindrical bearing 42 within the recessed cup portion 44.

The orbiting scroll element 36 includes an orbiting base member 70 and an orbiting spiral flange 72 projecting outward therefrom. In order to provide the stationary scroll element 37 referred to above, the stationary scroll 16 is in turn provided with a preferably integrally formed stationary spiral flange 74 which projects outward from the stationary scroll 16 and has a common central axis 40 with the crankshaft 14 As seen most clearly in FIGS. 3 and 5, the stationary and orbiting spiral flanges 74 and 72., respectively, are intermeshed and nested with one another, For those not familiar with the. manner in which compression is achieved in a scroll-type compressor, the compression mechanics may be difficult to visualize. However, for those of ordinary skill in the scroll-type' compressor arts, the compression mechanics are well understood. In brief, the stationary scroll flange 74, being affixed to or an integrally formed portion of the stationary scroll 16, is maintained stationary The orbiting scroll flange 72 executes an orbit of radius r with respect to the stationary scroll flange 74 and, during such orbiting motion, is maintained substantially non-rotational with respect to the stationary scroll flange 74. In other words, one may picture the stationary scroll flange 74 as having a stationary central axis z(stationary) 40, as well as remaining orthogonal coordinates x(stationary) and y(stationary) lying within the plane of the stationary spiral flange 74. One may also picture the orbiting spiral flange 72 as having an orbiting central axis z(orbiting) 46, as well as remaining orthogonal coordinates x(orbiting) and y(orbiting) lying within the plane of the orbiting spiral flange 72. In such case the orbiting motion which causes compression can be best described as an orbiting of the z(orbiting) central axis 46 about the z(stationary) central axis 40, while the remaining x and y axes of the stationary and orbiting spiral flanges remain in a parallel relationship to one another. In other words, the orbiting motion is accomplished with substantially no relative rotational motion occurring between the orbiting spiral flange 72 and the stationary spiral flange 74.

During such described motion, a compression pocket will be formed during each revolution of the orbiting spiral flange 72. The compression pocket so formed will spiral toward the central area of the intermeshed stationary and orbiting spiral flanges 74 and 72, respectively, advancing and undergoing a compression step uring each orbit. The number of revolutions required for a ompression pocket so formed to reach a compressed air output 76 which is located generally in the vicinity of the stationary central axis 40) depends on how many revolutions each of the stationary and orbiting spiral flanges 74 and 72, respectively, are provided with. In the present embodiment, each of the stationary and orbiting spiral flanges 74 and 72, respectively, is provided with somewhat over three revolutions. Preferably, each of the stationary and orbiting spiral flanges 74 and 72, respectively, extends over an arc of about 1350°, i.e., about 3¾ revolutions.

Figure 5:
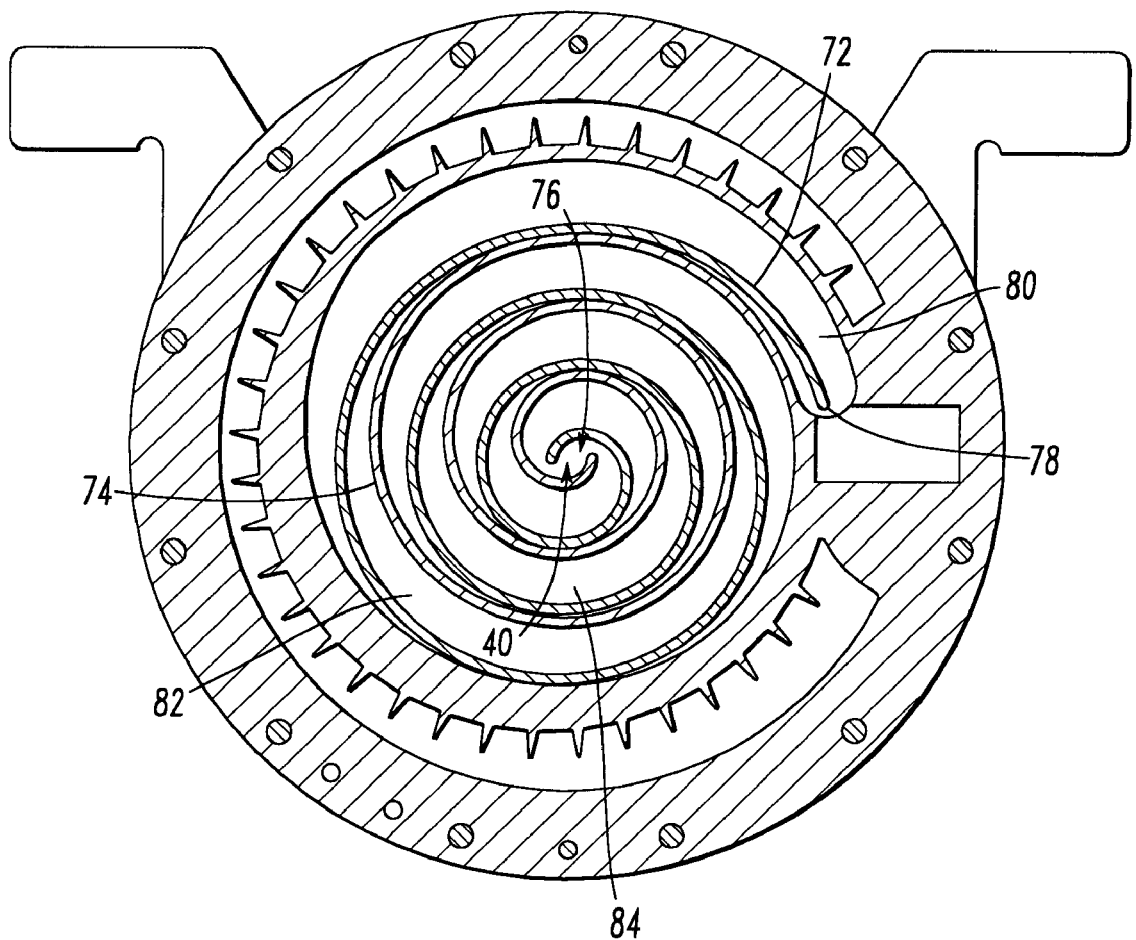
FIG. 5 is a cross sectional plan view of the inventive oiless rotary scroll compressor.

Referring now primarily to FIG. 5, the orbiting spiral flange 72 has a radially outward terminus portion 78. As the radially outward terminus portion 78 of the orbiting spiral flange 72 separates from the corresponding portion of the stationary spiral flange 74 during each non-rotational orbit, a progressively wider gap is formed into which low pressure air is introduced from a generally peripherally located suction region 80. As the orbiting spiral flange non-rotationally orbits further, this gap is eventually closed by the contact of the terminus portion 78 with the corresponding portion of the stationary spiral flange 74. The described action forms a compression pocket which spirals inward toward the centrally located compressed air output 76 during successive orbits of the orbiting spiral flange 72. Two successive compression pockets are generally designated as 82 and 84 in FIG. 5, with the more radially inward compression pocket 84 being more highly compressed than the more radially outward compression pocket 82.

Figure 8:
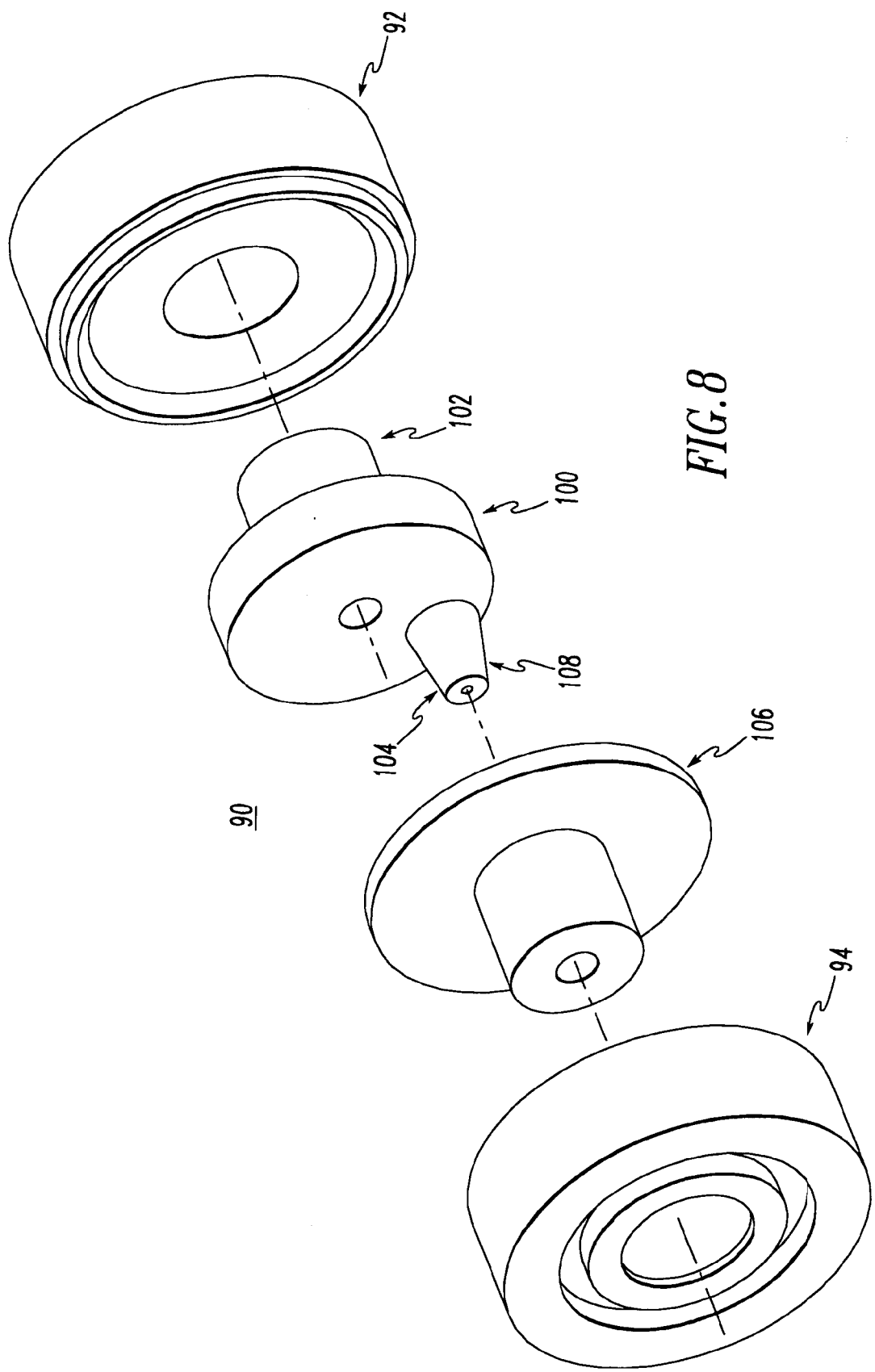
FIG. 8 is an exploded isometric view of an anti-rotation assembly employed in the inventive oiless rotary scroll compressor.
Figure 9:
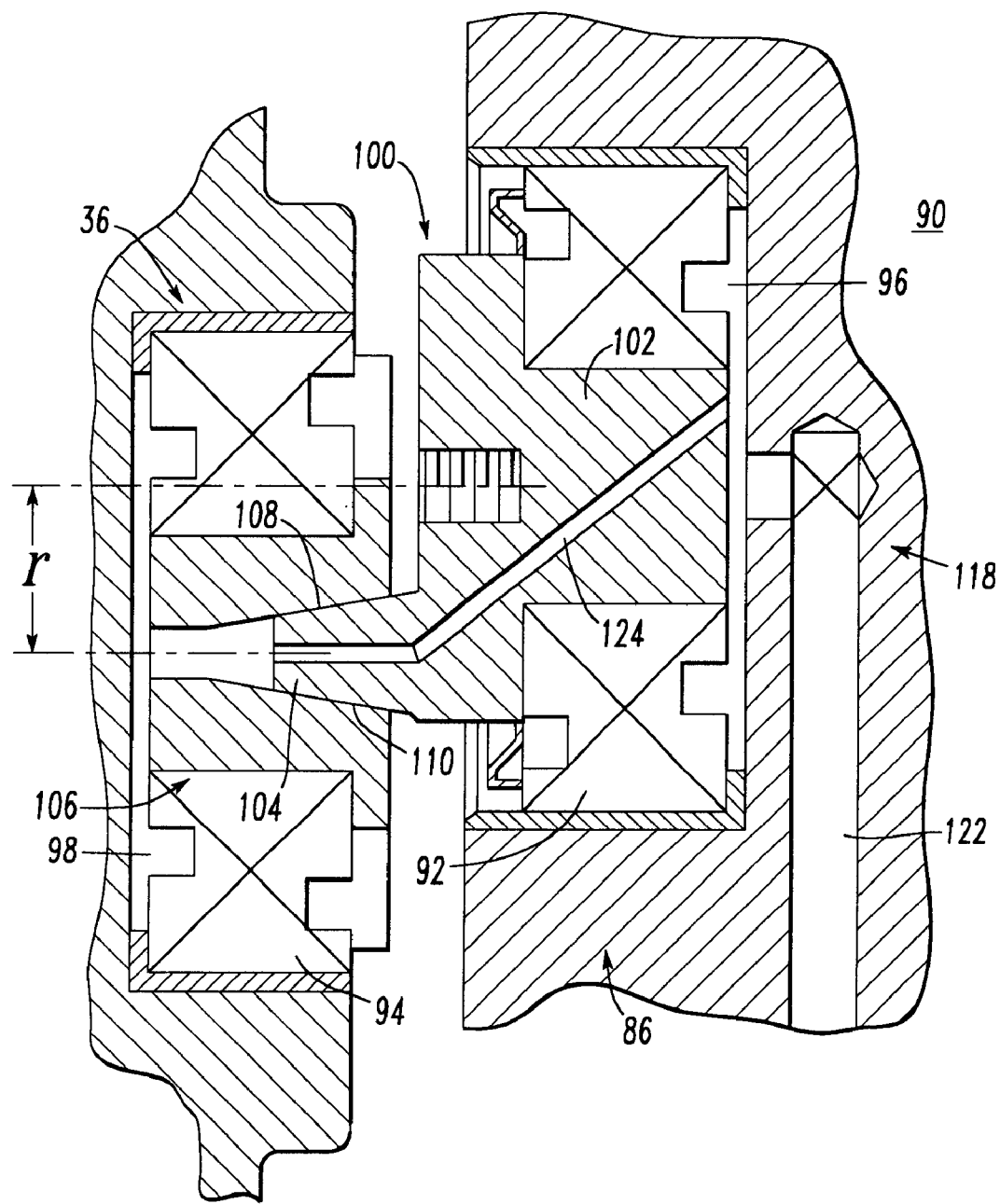
FIG. 9 is a cross sectional view of the anti-rotation assembly of FIG. 8.

In order to prevent any relative rotational movement between the stationary and orbiting spiral flanges 74 and 72 while simultaneously permitting the orbiting of the scroll element 36 through the orbit of radius r under the influence of the orbital drive mechanism described above, the scroll compressor 10 is additionally provided with an anti-rotation device 90 most clearly seen in FIGS. 3, 8 and 9, to which we now turn.

The bearing cap 12 is provided with a bearing face portion 86 (seen in FIGS. 2, 3, 4 and 9) which is formed as a semi-annular ledge projecting radially inward from the interior surface of the bearing cap 12. The bearing face portion 86 is provided with a cutout 88 (seen in FIG. 2) in order to provide clearance for the counterweight portion 52 of the crankshaft 14 during assembly/disassembly. Three anti-rotation assembly assemblies 90 are arranged equidistant from and preferably equally angularly spaced around the common central axis 40 of the stationary scroll element 37 and the crankshaft 14. Thus, the three anti-rotation assembly assemblies 90 are preferably spaced at angular intervals of 120°. In the presently preferred embodiment, each of the anti-rotation assembly assemblies 90 is radially spaced outward from the common central axis 40 of the crankshaft 14 and the stationary scroll element 37 at a distance R which is preferably substantially equal to about 5 inches.

Each anti-rotation assembly 90 includes a first rotational bearing 92 which is mounted fixedly and stationary with respect to the stationary scroll element 37, preferably in the bearing face portion 86 (as shown in FIGS. 3 and 9) and a second rotational bearing 94 which is mounted fixedly on the orbiting scroll element 36. Preferably, each first rotational bearing 92 is disposed in a first cavity 96 provided in the bearing face portion 86, while each second rotational bearing 94 resides in a corresponding second cavity 98 provided in the orbiting scroll element 36. Each anti-rotation assembly 90 further includes an offset crank member 100 having a first shaft portion 102 which engages the first rotational bearing 92 and a second conically tapered shaft portion 104 which engages a similarly conically tapered cavity 110 provided in a bushing member 106 which rotationally engages the second rotational bearing 94. The first and second shaft portions 102 and 104, respectively, are aligned substantially in parallel to one another and are separated by a radially offset distance r which is substantially equal to the radial offset r between the central axis 46 of the orbiting scroll element 37 and the common central axis 40 of the stationary scroll element 36 and the crankshaft 14, the distance r also being the radius of orbit of the orbiting scroll element 36.

The present inventors have discovered that a particularly effective method for providing the engagement between the second shaft portion 104 of the offset crank member 100 and the second rotational bearing 94 is through the provision of the bushing member 106 which is itself non-rotationally engaged with the second shaft portion 104 but is rotationally engaged with the second rotational bearing 94. To this end, the second shaft portion 104 is provided with a conically tapered portion 108 which nonrotationally connects via a friction push fit with the similarly tapered cavity 110 provided in the bushing member 106. The nontapered exterior periphery of the bushing 106 then rotationally mates with the second rotational bearing 94.

Figure 10:
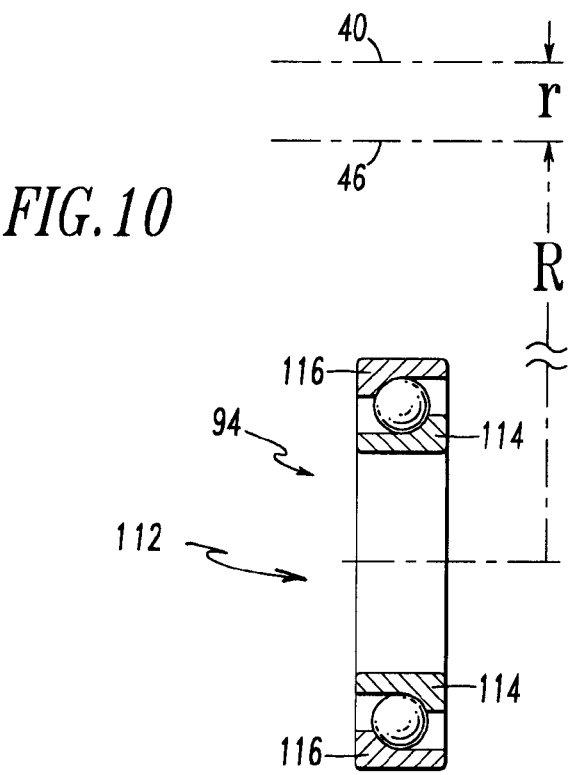
FIG. 10 is a cross sectional elevational view of an angular contact bearing assembly which is preferably utilized in the antirotation assembly of FIGS. 8 and 9.

During operation of the scroll compressor 10, the pressure that is built up (e.g., in the spiraling compression pockets 82 and 84) exerts an axial force, that is a force acting parallel to the central axes 40 and 46 which tends to separate the stationary and orbiting spiral elements 37 and 36, respectively, from one another. From the viewpoint of merely providing for a rotational motion between the first shaft portion 102 and the first rotational bearing 92 and also between the bushing member 106 and the second rotational bearing 94, it is sufficient to furnish the first and second rotational bearings 92 and 94, respectively, in the form of conventional ball bearing assemblies or conventional roller bearing assemblies. Back pressure could then, for example, be utilized to balance or compensate for the above-noted axial forces which tend to separate the stationary and orbiting spiral elements 37 and 36, respectively. However, the present inventors have discovered that by utilizing a particular type of bearing for the first and second rotational bearings 92 and 94, respectively, the above-noted separating axial forces may be neutralized directly, thus eliminating the requirement of utilizing back pressure. In this regard, the rotational bearing components 92 and 94, respectively, are each preferably furnished in the form of angular contact bearing assemblies 112, an example of which is shown most particularly in FIG. 10. FIG. 10 shows the second rotational bearing 94 being provided as an angular contact bearing assembly 112 and the positioning of the second rotational bearing 94 relative to the central axes 40 and 46 during one extreme of the rotational orbit. It will be understood that the first rotational bearing 92 may be likewise provided in the form of a similar angular contact bearing assembly 112. Preferably, both of the first and second rotational bearing components 92 and 94, respectively, are provided. in the form of an angular contact bearing assembly 112.

As seen in FIG. 10, the angular contact bearing assemblies 112 which. are preferably employed for the first and second rotational bearing components 92 and 94, respectively, include at least one bearing surface 114 and/or 116 which projects a non-zero component parallel to the direction of the central axis 40 of the stationary scroll element 37 and parallel to the direction of the central axis 46 of the orbiting scroll element 36, both central axes 40 and 46 being parallel to one another. Due to the fact that the bearing surfaces 114 and/or 116 have a non-zero component projecting in a direction parallel to the central axes 40 and 46, the angular contact bearing assemblies 112 are able to resist the above-noted axial forces generated during compression which tend to exert a separating force between the stationary and orbiting scroll elements 37 and 36, respectively. Preferably, the angular contact bearing assemblies 112 employed are angular contact ball bearing assemblies and are of a single row configuration. Such angular contact ball bearing assemblies are available commercially and are well known to those of ordinary skill in the mechanical arts. Such angular contact ball bearing assemblies typically include two such bearing surfaces 114 and 116 which are angled so as to resist angular forces (i.e., having non-zero components in two orthogonal directions) applied thereto.

While it is possible to provide the rotational bearing components 92 and 94 in the form of sealed pre-lubricated bearing assemblies, in its presently preferred embodiment, the scroll compressor 10 includes a lubrication apparatus 118 for allowing the rotational bearing components 92 and 94 to be periodically lubricated. Provision of the lubrication apparatus 118 allows for a longer life of the first and second rotational bearing components 92 and 94, respectively. Utilizing sealed prelubricated bearings could necessitate a costly disassembly procedure for replacement of the bearings near the end of their rated life. The provision of the lubrication apparatus 118 is made possible by a further unique construction of the anti-rotation assembly assemblies 90, wherein each of the first rotational bearing components 92 is fixedly mounted within the bearing cap 12 and wherein a lubrication channel portion is provided which interconnects the respective first and second rotational bearing components 92 and 94, respectively.

Referring most particularly to FIG. 3, a lubrication port 120 is disposed on the exterior surface of the bearing cap 12 adjacent each of the anti-rotation assembly assemblies 90. A lubrication channel 122 extends from each of the lubrication ports 120 to at least a point adjacent the first rotational bearing 92 of the associated anti-rotation assembly 90. As is shown most particularly in FIG. 9, a channel portion 124 passing through the offset crank member 100 extends the lubrication channel 122 so that it ultimately extends to another point adjacent the second rotational bearing 94. A lubricating agent (e.g., grease) introduced into the lubrication channel 122 through the lubrication port 120 lubricates the first rotational bearing 92 via the first cavity 96 provided in the bearing face portion 86 in which the first rotational bearing 92 is mounted. Additionally, the lubricating agent is conducted through the channel portion 124 in the offset crank member 100 to the second cavity 98 provided in the orbiting scroll element 36, thereby lubricating the second rotational bearing 94.

Figure 11:
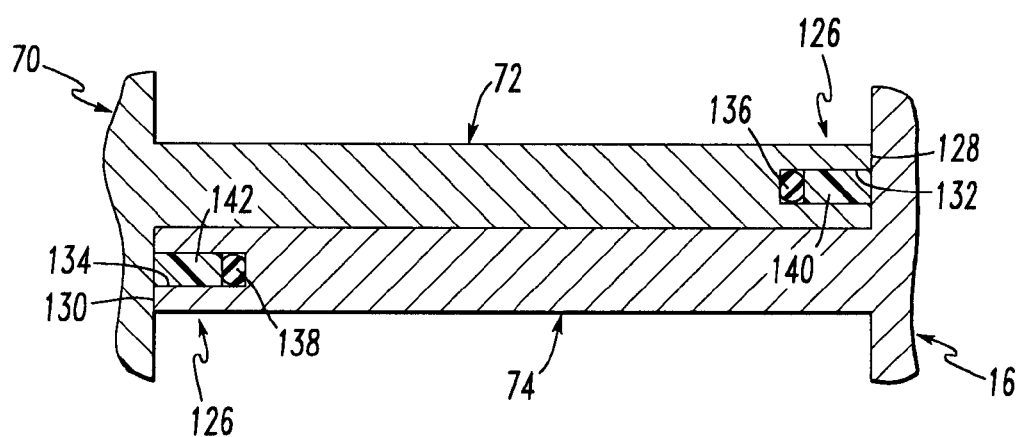
FIG. 11 is a cross sectional view through an orbiting spiral flange and a stationary spiral flange of the inventive oiless rotary scroll compressor, showing a novel tipseal assembly for providing a substantially airtight seal therebetween.
Figure 12:
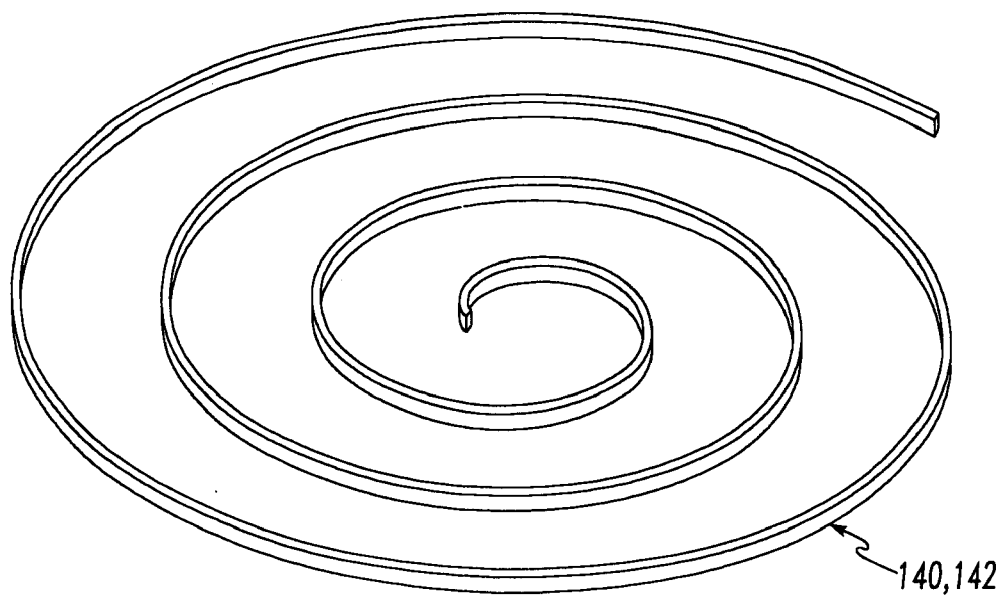
FIG. 12 is an isometric view of a tipseal element utilized in the tipseal assembly of FIG. 11.

As noted above, the orbiting spiral flange 12 and the stationary spiral flange 74 are nested and intermeshed with one another to form the spiraling compression pockets 82 and 84 shown in FIG. 5. In order to provide a substantially airtight seal for these spiraling compression pockets (e.g., 82 and 84) the present scroll compressor 10 employs a unique "tipseal" assembly 126, generally illustrated in FIG. 3 and most particularly shown in FIGS. 11 and 12, to which we now turn.

The orbiting spiral flange 72 projecting outward from the orbiting base member 70 of the orbiting scroll element 36 terminates in an end surface 128 which is positioned immediately adjacent to and opposes the stationary scroll 16. Similarly, the stationary spiral flange 74 projecting outward from the stationary scroll 16 terminates in an end surface 130 which is positioned immediately adjacent to and opposes the orbiting base member 70.

Each of the end surfaces 128 and 130 are provided with an inwardly extending groove 132 and 134, respectively. Preferably, each of the grooves 132 and 134 extends substantially over the entire extent of the associated end surface 128 and 130, respectively. A compressible element 136 is disposed within the groove 132, and another compressible element 138 is similarly disposed within groove 134. A first tipseal element 140 overlays compressible element 136, while a second tipseal element 142 overlays compressible element 138. The depths of the grooves 132 and 134, the heights of the compressible elements 136 and 138 and the heights of the tipseal elements 140 and 142 are all selectively chosen such that, with these components in their assembled configuration and with the compressible elements 136 and 138 in a substantially uncompressed state, each respective tipseal element 140 and 142 extends beyond the respective end surface 128 and 130 by a measurement ranging between about 0.018 inch and 0.022 inch. Stated another way, the combined height of the compressible element 136 and the tipseal element 140 exceeds the depth of the groove 132 by about 0.018 inch to about 0.022 inch when the compressible element 136 is in a substantially compressed state. Similarly, the combined height of the compressible element 138 and the tipseal element 142 exceeds the depth of the groove 134 by about 0.018 inch to about 0.022 inch when the compressible element 138 is in a substantially compressed state.

When the scroll compressor is in its assembled state (for example, as shown in FIG. 3), the compressible elements 136 and 138 will become somewhat compressed such that they exert biasing forces on the respective tipseal elements 140 and 142 urging them into contact with the respective opposing surfaces of stationary scroll 16 and orbiting base member 70 to thereby form substantially airtight seals for the spiraling compression pockets (e.g., 82 and 84) formed between the nested and intermeshed stationary scroll element 37 and orbiting scroll element 36. The present inventors have achieved good performance by providing the compressible elements 136 and 138 in the form of an elongated 0-ring made of an elastomeric material, most preferably a silicone rubber material, and even more preferably a high temperature resistant 0-ring material. Similarly, good performance has been achieved by furnishing the tipseal elements 140 and 142 in the form of a non-metallic substance, preferably a PTFE based product, and most preferably a fluorosint material.

The air inlet valve assembly 34 discussed briefly above in connection with FIGS. 1 and 2 is more particularly illustrated in FIGS. 4 and 13-15, to which we now turn.

The air inlet valve assembly 34 is provided in order to conduct ambient air to the suction region 80 (shown in FIGS. 5 and 13) which is located generally peripherally around the orbiting and stationary spiral flanges 72 and 74, respectively, and to also prevent any backward rotation of the orbiting scroll element 36 upon shut down of the power source which drives the crankshaft 14. To this end, an air inlet channel 144 connects the ambient environment located outside of the bearing cap 12 to the suction region 80 located within the bearing cap 12. As shown in FIG. 4, the air inlet channel 144 preferably passes through the stationary scroll 16. In the configuration of FIG. 4, a portion of the air inlet channel 144 is formed by an air inlet part 146 formed in the stationary scroll 16. The air inlet valve assembly 34 includes a valve piston 148 which is positioned within the air inlet channel 144. The valve piston 148 is moveable between a first position (shown in FIGS. 4, 13 and 14) wherein the valve piston 148 substantially blocks any flow through the air inlet channel 144 and a second position wherein the valve piston 148 substantially unblocks flow through the air inlet channel 144, The valve piston 148 is biased toward the first blocking position by a biasing member 150. More particularly, the air inlet valve assembly 34 further includes a valve seat 152 which is mounted stationary with respect to the stationary scroll 16, and the biasing member 150 urges the valve piston 148 into contact with the valve seat 152 thereby preventing flow past the valve piston 148 and substantially blocking the air intake channel 144. 15 The valve seat 152 is disposed on the opposite side of the valve piston 148 from the suction region 80, and therefore, the force exerted by the biasing member 150 is in a direction substantially away from the suction region 80.

Figure 13:
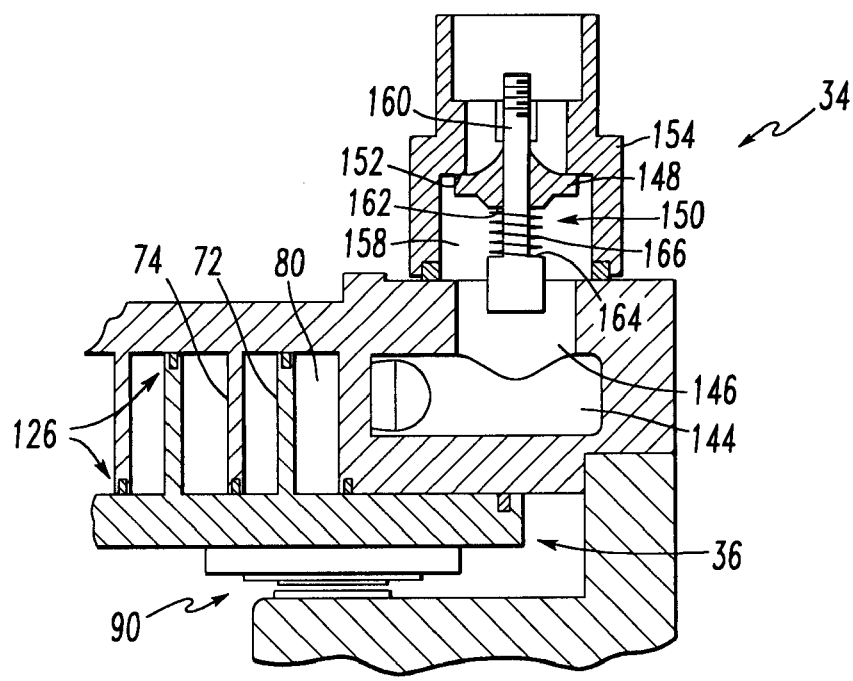
FIG. 13 is an enlarged view of a portion of the elevational cross section of FIG. 4, most particularly showing an air inlet valve assembly used to provide ambient air to be compressed to the inventive oiless rotary scroll compressor.

In the embodiment shown in FIGS. 2, 4 and 13, a valve housing 154 is provided which connects to the stationary scroll 16 via bolts 156. The valve piston 148 is disposed within a valve cavity 158 that is formed within the valve housing 154, and the valve seat 1S2 is provided as a surface formed within the valve cavity 158 enclosed by the valve housing 154. A valve stem 160 is connected to and extends from the valve housing 154 in the direction of the suction region 80. The valve piston 148 surrounds the valve stem 160 and is able to reciprocate in a sliding fashion thereon. A first stop surface 162 is formed on the valve piston 148. A second stop surface 164 is formed on the valve stem 160 and is disposed between the first stop surface 162 formed on the valve piston 148 and the suction region 80 The biasing member 150 is preferably provided in the form of a coil spring 166 which encircles the valve stem 160 between the first stop surface 162 and the second stop surface 164. The valve piston 148 is able to slide along the valve stem 160 in the direction of the suction region 80 to admit ambient air to be compressed against the biasing force exerted by the coil spring 166. Movement of the valve piston 148 in the direction of the suction region 80 is limited by contact of the first stop surface 162 provided on the valve piston 148 with the second stop surface 164 formed on the valve stem 160.

In the embodiment of the air inlet valve assembly 34 shown in FIGS. 2, 4 and 13, it is possible that vibration characteristics could be introduced by the presence of the biasing element 150 (e.g., the coil spring 166). In such cases, the present inventors have discovered that the biasing element 150 (e.g., coil spring 166) and its associated supporting structures may be eliminated from the design without introducing any serious compromise in function.

Figure 14:
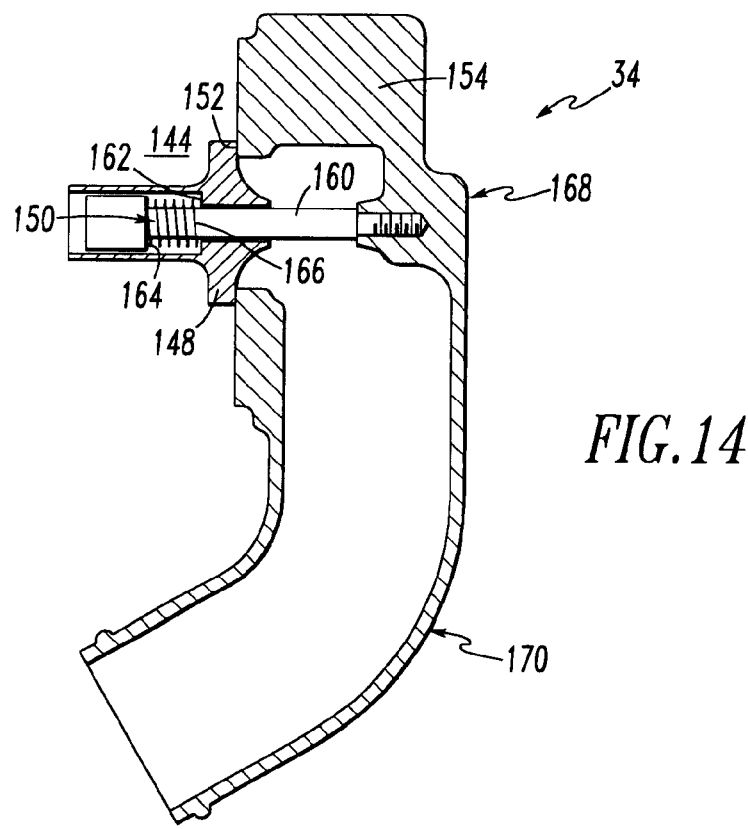
FIG. 14 is a cross sectional elevational view of an alternative embodiment of the air inlet valve assembly.
Figure 15:
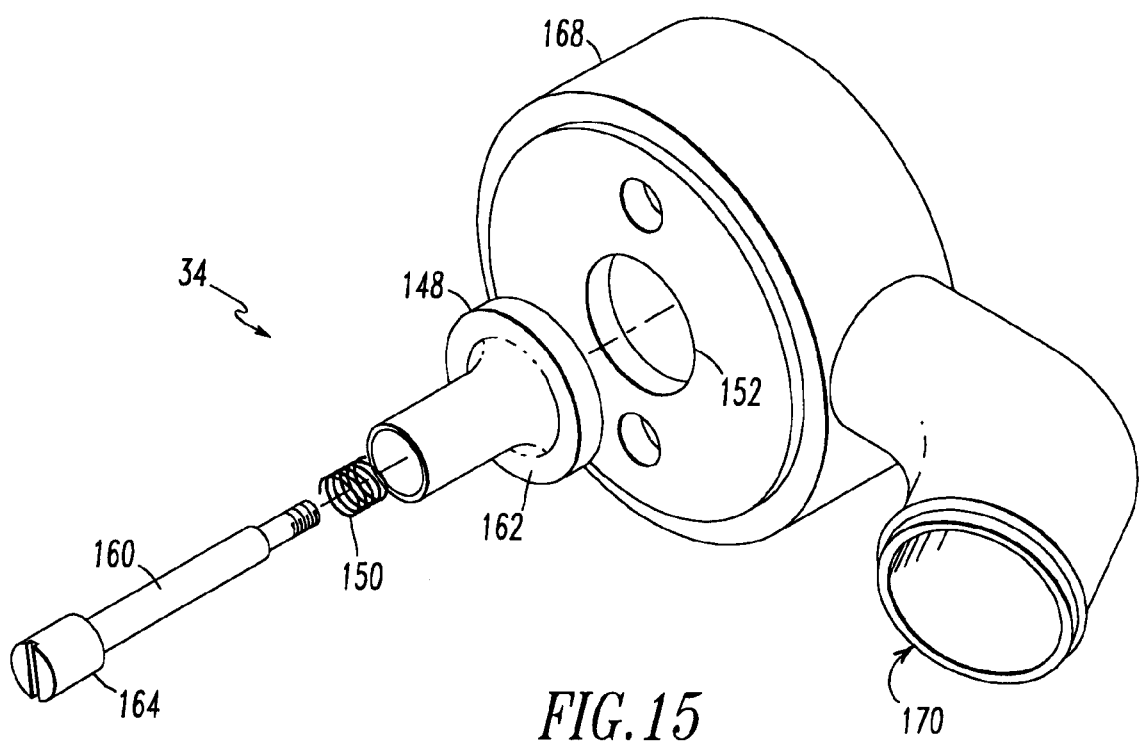
FIG. 15 is an exploded isometric view of the alternative air inlet assembly of FIG. 14.

FIGS. 14 and 15 illustrate an alternative embodiment of the air inlet valve assembly 34 which functions in substantially the same manner as described above but which is provided with a somewhat differently configured air intake valve body 168 having an air intake conduit 170 extending therefrom.

While the present invention has been described by way of a detailed description of a particularly preferred embodiment or embodiments, it will be apparent to those of ordinary skill in the art that various substitutions of equivalents may be affected without departing from the spirit or scope of the invention as set forth in the appended claims.

We claim:

1. An axial force resistant anti-rotation bearing for a scroll compressor, said axial force resistant anti-rotation bearing being able to resist both radial and axial forces, such scroll compressor including a housing, a stationary scroll element mounted within such housing substantially stationary with respect to such housing and having a stationary spiral flange projecting therefrom, an orbiting scroll element disposed within such housing and having an orbiting spiral flange projecting therefrom, such stationary and orbiting spiral flanges being intermeshed and nested with one another to define a spiraling compression pocket therebetween, each of such stationary and orbiting scroll elements having a substantially central axis, and an orbital drive mechanism for driving such central axis of such orbiting scroll element in an orbit at a radius of orbit about such central axis of such stationary scroll element, said axial force resistant anti-rotation bearing comprising:

a first bearing element mounted substantially stationary with respect to said stationary scroll element;

a second bearing element mounted on said orbiting scroll element; and a crank member interconnecting said first and second bearing elements, said crank member including a first shaft portion being rotatably engaged with said first bearing element and a second shaft portion being rotatably engaged with said second bearing element, said first and second shaft portions of said crank member having a radial offset with respect to one another;

at least one of said first bearing element and said second bearing element including a bearing surface which projects a substantially nonzero component in a direction of such central axes of such stationary and orbiting scroll elements.

2. An axial force resistant anti-rotation bearing for a scroll compressor according to claim 1, wherein at least one of said first bearing element and said second bearing element includes an angular contact bearing assembly.

3. An axial force resistant anti-rotation bearing for a scroll compressor according to claim 2, wherein said angular contact bearing assembly is an angular contact ball bearing assembly.

4. An axial force resistant anti-rotation bearing for a scroll compressor according to claim 1, wherein said radial offset of said first and second shaft portions of said crank member is substantially equal to such radius of orbit of such central axis of such orbiting scroll element about such central axis of such stationary scroll element.

5. An axial force resistant anti-rotation bearing for a scroll compressor according to claim 1, wherein said axial force resistant anti-rotation bearing additionally includes:

a bushing member rotationally mounted within said second bearing element mounted on said orbiting scroll element;

said second shaft portion of said crank member connecting to said bushing member.

6. An axial force resistant anti-rotation bearing for a scroll compressor according to claim 5, wherein said axial force resistant anti-rotation bearing additionally includes a conically tapered portion provided on said second shaft portion, said conically tapered portion provided on said second shaft portion substantially non-rotatably engaging said bushing member.

7. An axial force resistant anti-rotation bearing for a scroll compressor according to claim 1, wherein said anti-rotation bearing for a scroll compressor additionally includes a plurality of said anti-rotation bearings, said plurality of said anti- rotation bearings being angularly spaced from one another around such central axis of such stationary scroll element.

8. An axial force resistant anti-rotation bearing for a scroll compressor according to claim 1, wherein said anti-rotation bearing for a scroll compressor additionally includes at least three of said anti-rotation bearings, said three of said anti-rotation bearings being substantially equally angularly spaced around such central axis of such stationary scroll element at consecutive angular displacements of substantially about 120 degrees.

9. An axial force resistant anti-rotation bearing for a scroll compressor according to claim 1, wherein such central axis of such orbiting scroll element is radially offset with respect to such central axis of such stationary scroll element by a radially offset distance and wherein said first and second shaft portions of said crank member are radially offset with respect to one another by substantially the same distance as said radially offset distance.

10. An axial force resistant anti-rotation bearing for a scroll compressor according to claim 7, wherein:
    said radially offset distance between said first and second shaft portions of said crank member and such radius of orbit of such central axis of such, orbiting scroll element about such central axis of such stationary scroll element are both substantially equal to about 0.4 inch; and
    each of said plurality of anti-rotation bearings is radially spaced from such central axis of such stationary scroll element by substantially about 5 inches.

11. In a scroll compressor including a housing, a stationary scroll element disposed within such housing substantially stationary with respect to such housing, such stationary scroll element including a stationary spiral flange, an orbiting scroll element disposed within such housing, such orbiting scroll element including an orbiting spiral flange, such stationary and orbiting spiral flanges being intermeshed and nested with one another to define a spiraling compression pocket therebetween, each of such stationary and orbiting scroll elements having a substantially central axis, and an orbital drive mechanism for driving such central axis of such orbiting scroll element in an orbit at a radius of orbit about such central axis of such stationary scroll element, an improved anti-rotation device for maintaining such central axis of such orbiting scroll element substantially non rotational with respect to such central axis of such stationary scroll element during such orbit of such central axis of such orbiting scroll element about such central axis of such stationary scroll element, said improved anti-rotation device comprising at least one anti-rotation bearing, said at least one anti-rotation bearing comprising;
    a first bearing element mounted substantially stationary with respect to said stationary scroll element;
    a second bearing element mounted on said orbiting scroll element; and
    a crank member interconnecting said first and second bearing lements, said crank member including a first shaft portion being otatably engaged with said first bearing element and a second haft portion being rotatably engaged with said second bearing element, said first and second shaft portions of said crank member having a radial offset with respect to one another;
    at least one of said first bearing element and said second bearing element including a bearing surface which projects a substantially nonzero component in a direction of such central axes of such stationary and orbiting scroll elements.

12. An improved anti-rotation device for a scroll compressor according to claim 11, wherein at least one of said first bearing element and said second bearing element includes an angular contact bearing assembly.

13. An improved anti-rotation device for a scroll compressor according to claim 12, wherein said angular contact bearing assembly is an angular contact ball bearing assembly.

14. An improved anti-rotation device for a scroll compressor according to claim 11, wherein said radial offset of said first and second shaft portions of said crank member is substantially equal to such radius of orbit of such central axis of such orbiting scroll element about such central axis of such stationary scroll element.

15. An improved anti-rotation device for a scroll compressor ccording to claim 11, wherein said anti-rotation bearing additionally includes:
    a bushing member rotationally mounted within said second bearing element mounted on said orbiting scroll element;
    said second shaft portion of said crank member connecting to said bushing member.

16. An improved anti-rotation device for a scroll compressor according to claim 15, wherein said anti-rotation bearing additionally includes a conically tapered portion provided on said second shaft portion, said conically tapered portion provided on said second shaft portion substantially non-rotatably engaging said bushing member.

17. An improved anti-rotation device for a scroll compressor according to claim 11, wherein said anti-rotation bearing for a scroll compressor additionally includes a plurality of said antirotation bearings, said plurality of said anti-rotation bearings being angularly spaced from one another around such central axis of such stationary scroll element.

18. An improved anti-rotation device for a scroll compressor according to claim 11, wherein said anti-rotation bearing for a scroll compressor additionally includes at least three of said anti-rotation bearings, said three of said anti-rotation bearings being substantially equally angularly spaced around such central axis of such stationary scroll element at consecutive angular displacements of substantially about 120 degrees.

19. An improved anti-rotation device for a scroll compressor according to claim 11, wherein such central axis of such orbiting scroll element is radially offset with respect to such central axis of such stationary scroll element by a radially offset distance and wherein said first and second shaft portions of said crank member are radially offset with respect to one another by substantially the same distance as said radially offset distance.

20. An improved anti-rotation device for a scroll compressor according to claim 17, wherein:
    said radially offset distance between said first and second shaft portions of said crank member and such radius of orbit of such central axis of such orbiting scroll element about such central axis of such stationary scroll element are both substantially equal to about 0.4 inch; and each of said plurality of anti-rotation bearings is radially paced from such central axis of such stationary scroll element by ubstantially about 5 inches.

21. A scroll compressor including an axial force resistant anti-rotation device, comprising:
a housing;
a stationary scroll element mounted within said housing substantially stationary with respect to said housing, said stationary scroll element including a stationary spiral flange;
an orbiting scroll element disposed within said housing, said orbiting scroll element including an orbiting spiral flange;
said stationary and orbiting spiral flanges being intermeshed and nested with one another to define a spiraling compression pocket therebetween;
each of said stationary and orbiting scroll elements having a substantially central axis;
orbital drive means for driving said central axis of said orbiting scroll element in an orbit at a radius of orbit about said central axis of said stationary scroll element;
said axial force resistant anti-rotation device for maintaining said orbiting scroll element substantially non-rotational with respect to said stationary scroll element during orbiting of said central axis of said orbiting scroll element about said central axis of said stationary scroll element, said axial force resistant anti-rotation device being able to resist both radial and axial forces including:
a first bearing element mounted substantially stationary with respect to said stationary scroll element;
a second bearing element mounted on said orbiting scroll element; and
a crank member interconnecting said first and second bearing elements, said crank member including a first shaft portion being rotatably engaged with said first bearing element and a second shaft portion being rotatably engaged with said second bearing element, said first and second shaft portions of said crank member having a radial offset with respect to one another;
at least one of said first bearing element and said second bearing element including a bearing surface which projects a substantially nonzero component in a direction of such central axes of such stationary and orbiting scroll elements.

22. A scroll compressor including an axial force resistant anti-rotation device according to claim 21, wherein at least one of said first bearing element and said second bearing element includes an angular contact bearing assembly.

23. A scroll compressor including an axial force resistant anti-rotation device according to claim 22, wherein said angular contact bearing assembly is an angular contact ball bearing assembly.

24. A scroll compressor including an axial force resistant anti-rotation device according to claim 21, wherein said radial offset of said first and second shaft portions of said crank member is substantially equal to such radius of orbit of such central axis of such orbiting scroll element about such central axis of such stationary scroll element.

25. A scroll compressor including an axial force resistant anti-rotation device according to claim 21, wherein said axial force resistant anti-rotation device additionally includes:
a bushing member rotationally mounted within said second bearing element mounted on said orbiting scroll element;
said second shaft portion of said crank member connecting to said bushing member.

26. A scroll compressor including an axial force resistant anti-rotation device according to claim 25, wherein said axial force resistant anti-rotation device additionally includes a conically tapered portion provided on said second shaft portion, said conically tapered portion provided on said second shaft portion substantially non-rotatably engaging said bushing member.

27. A scroll compressor including an axial force resistant anti-rotation device according to claim 21, wherein said anti-rotation device for a scroll compressor additionally includes a plurality of anti-rotation bearings, said plurality of said anti-rotation bearings being angularly spaced from one another around such central axis of such stationary scroll element.

28. A scroll compressor including an axial force resistant anti-rotation bearing according to claim 21, wherein said anti-rotation device for a scroll compressor additionally includes at least three anti-rotation bearings, said at least three anti-rotation bearings being substantially equally angularly spaced around such central axis of such stationary scroll element at consecutive angular displacements of substantially about 120 degrees.

29. A scroll compressor including an axial force resistant anti-rotation device according to claim 21, wherein such central axis of such orbiting scroll element is radially offset with respect to such central axis of such stationary scroll element by a radially offset distance and wherein said first and second shaft portions of said crank member are radially offset with respect to one another by substantially the same distance as said radially offset distance.

30. A scroll compressor including an axial force resistant anti-rotation device according to claim 27, wherein:
said radially offset distance between said first and second shaft portions of said crank member and such radius of orbit of such central axis of such orbiting scroll element about such central axis of such stationary scroll element are both substantially equal to about 0.4 inch; and
each of said plurality of anti-rotation bearings is radially spaced from such central axis of such stationary scroll element by substantially about 5 inches.

* * * * *